(12) United States Patent
Stockmann et al.

(10) Patent No.: US 9,971,027 B1
(45) Date of Patent: May 15, 2018

(54) METHODS AND SYSTEMS FOR SUPPRESSING CLUTTER IN RADAR SYSTEMS

(71) Applicant: Helios Remote Sensing Systems, Inc., Rome, NY (US)

(72) Inventors: Peter H. Stockmann, Jamesville, NY (US); Richard Wasiewicz, Tully, NY (US)

(73) Assignee: Helios Remote Sensing Systems, Inc., Rome, NY (US)

( * ) Notice: Subject to any disclaimer, the term of this patent is extended or adjusted under 35 U.S.C. 154(b) by 0 days. days.

(21) Appl. No.: 15/809,060

(22) Filed: Nov. 10, 2017

(51) Int. Cl.
| | |
|---|---|
| *G01S 13/52* | (2006.01) |
| *G01S 13/524* | (2006.01) |
| *G01S 7/28* | (2006.01) |
| *H04B 7/08* | (2006.01) |
| G01S 13/02 | (2006.01) |
| H04L 25/03 | (2006.01) |

(52) U.S. Cl.
CPC ........ *G01S 13/5244* (2013.01); *G01S 7/2813* (2013.01); *G01S 13/5246* (2013.01); *H04B 7/0848* (2013.01); *G01S 2013/0245* (2013.01); *H04L 2025/03605* (2013.01)

(58) Field of Classification Search
CPC .... G01S 7/2813; G01S 7/292; G01S 13/5244; G01S 13/5246
See application file for complete search history.

(56) References Cited

U.S. PATENT DOCUMENTS

| | | | | | |
|---|---|---|---|---|---|
| 3,995,271 | A | * | 11/1976 | Goggins, Jr. ......... | G01S 7/2813 342/102 |
| 4,339,754 | A | * | 7/1982 | Hammers ............... | G01S 13/52 342/16 |
| 4,394,658 | A | * | 7/1983 | Short, III ............ | G01S 13/5244 342/160 |
| 5,485,157 | A | * | 1/1996 | Long ..................... | G01S 7/2927 342/159 |
| 5,706,013 | A | * | 1/1998 | Melvin ................. | G01S 7/2923 342/159 |

(Continued)

OTHER PUBLICATIONS

Parker, Michael, "Radar Basics—Part 1," EE Times, May 17, 2011, 5 pages.

(Continued)

*Primary Examiner* — Peter M Bythrow
(74) *Attorney, Agent, or Firm* — Tech Valley Patent, LLC; John Pietrangelo

(57) ABSTRACT

Methods and systems for suppressing clutter, for example, ground clutter, in radar systems are provided. The methods and systems can be employed in radar systems having an antenna system and at least two receive beams, for example, a main beam and an auxiliary beam. The methods include receiving data streams from each of the at least two receive beams, where each data stream is associated with range bins and include data representing clutter, and, before or after Doppler filtering, generating an adaptive weight from summations of the data streams for each of the range bins, and applying the generated weight to at least one of the data streams to provide Doppler filtered and spatially nulled data streams that can be used to more accurately identify targets, such as, aircraft.

20 Claims, 9 Drawing Sheets

(56) References Cited

U.S. PATENT DOCUMENTS

| | | | | |
|---|---|---|---|---|
| 6,809,682 | B1 * | 10/2004 | Madewell | G01S 13/24 342/159 |
| 7,154,433 | B1 * | 12/2006 | Madewell | G01S 13/24 342/160 |
| 8,577,298 | B2 | 11/2013 | Parks et al. | |
| 8,717,230 | B1 * | 5/2014 | Fischi | G01S 7/2813 342/159 |
| 8,947,294 | B1 * | 2/2015 | Wasiewicz | G01S 7/2813 342/159 |
| 8,952,844 | B1 * | 2/2015 | Wasiewicz | H04L 25/03019 342/159 |
| 8,970,426 | B1 * | 3/2015 | Stockmann | G01S 13/5244 342/159 |
| 9,170,320 | B1 * | 10/2015 | Stockmann | G01S 7/2813 |
| 9,482,744 | B1 * | 11/2016 | Neary | G01S 13/225 |
| 9,810,771 | B1 * | 11/2017 | Wasiewicz | G01S 7/2813 |
| 9,829,576 | B2 * | 11/2017 | Minowa | G01S 13/524 |
| 9,857,453 | B1 * | 1/2018 | DeSimone, Jr. | G01S 7/02 |
| 2006/0109161 | A1 * | 5/2006 | Krikorian | G01S 13/90 342/25 B |
| 2006/0109173 | A1 * | 5/2006 | Erikmats | G01S 13/5242 342/159 |
| 2007/0247353 | A1 * | 10/2007 | Budic | G01S 7/414 342/159 |
| 2009/0109083 | A1 * | 4/2009 | Tietjen | G01S 13/28 342/91 |

OTHER PUBLICATIONS

Parker, Michael, "Radar Basics—Part 2: Pulse Doppler Radar," EE Times, May 28, 2011, 8 pages.

Parker, Michael, "Radar Basics—Part 3: Beamforming and radar digital processing," EE Times, Jun. 10, 2011, 9 pages.

Goebel, Greg, "Modern Radar Technology," May 1, 2017, [http://vc.airvectors.net/ttradar_3.html], 13 pages.

* cited by examiner

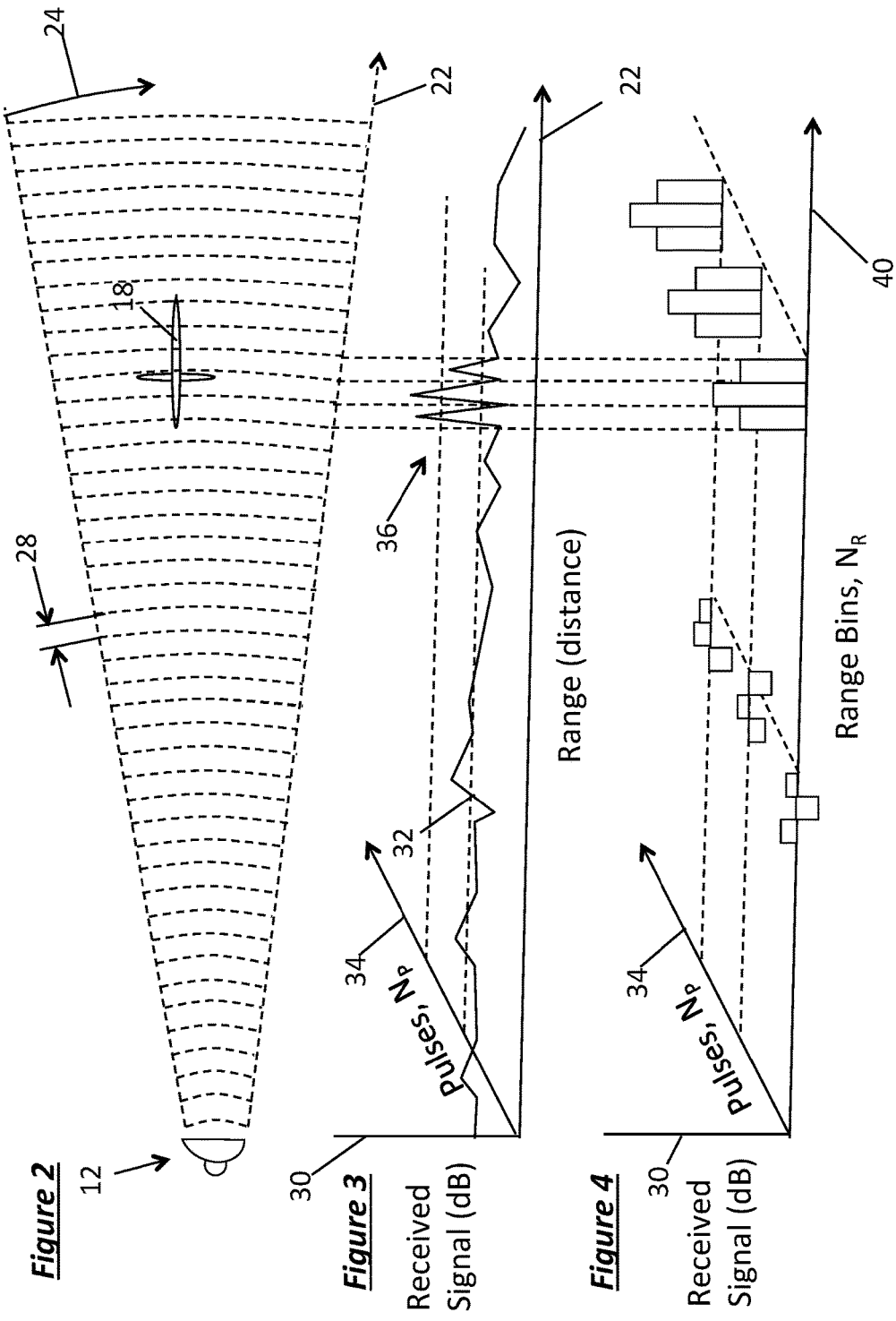

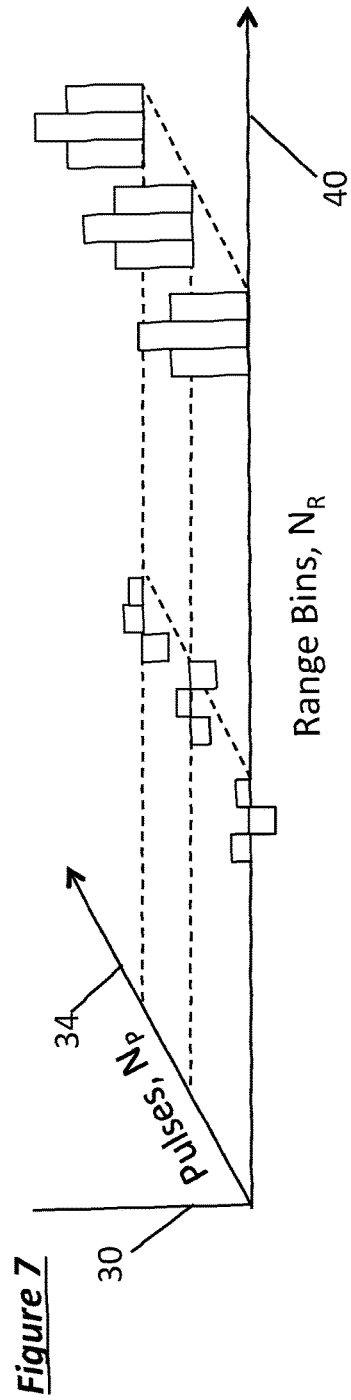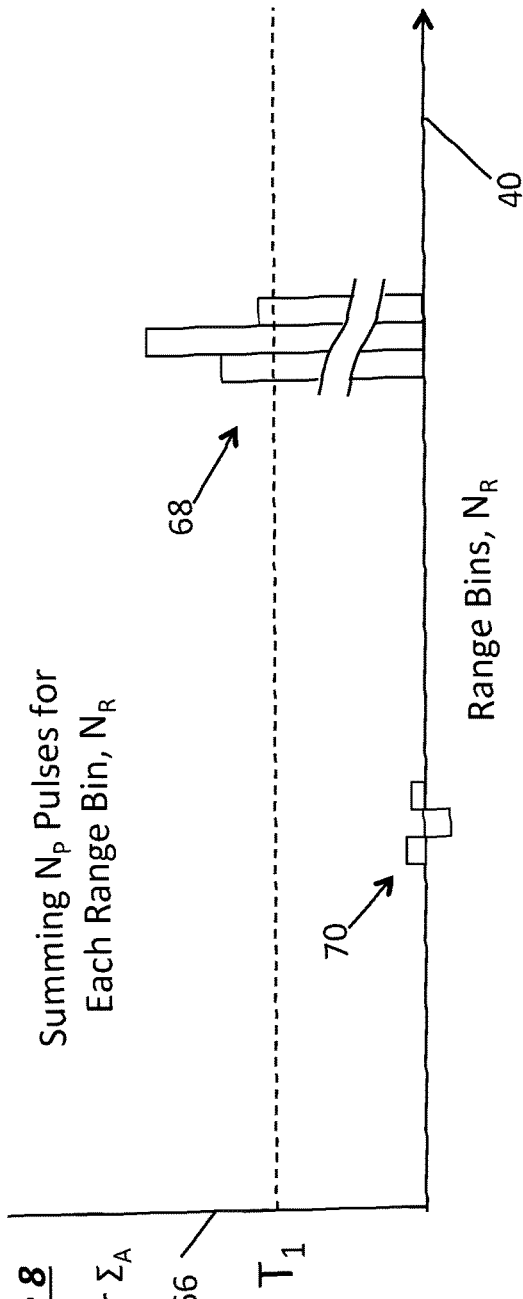
*Figure 7*
*Figure 8*

METHODS AND SYSTEMS FOR SUPPRESSING CLUTTER IN RADAR SYSTEMS

BACKGROUND OF THE INVENTION

Technical Field

The present invention relates to signal processing systems used in remote sensing systems, such as, radar systems. More particularly, the present invention relates to methods and systems for reducing and/or eliminating clutter from the detected signals in such systems.

Description of Related Art

In the detection of targets with remote sensing systems, the most common of which is radar, the presence of "clutter" superimposed on the desired return signal from targets, for example, reflected from commercial or military aircraft, can present a technical challenge in the detection and processing of the desired signal components. As known in the art, clutter can include stationary, moving structures, such as, vehicles, and/or features of a given landscape being monitored. Relatively stationary clutter sources include, for example, the ground, bodies of water, and various atmospheric conditions. Moving or "Doppler" clutter sources may include precipitation and generally stationary objects having moving components, such as wind turbines or wind-blown foliage.

The primary defense against terrain surface clutter is "Doppler processing." In Doppler processing multiple Doppler filters tuned to potential target radial velocities are designed to have low response over the narrow "zero-mean velocity" band characteristic of terrain clutter. As known in the art, the "Doppler frequency," $f_D$, of a source is given by $$f_D = 2V_s/\lambda,$$

where $V_s$ is the radial velocity of the source and $\lambda$ is the wavelength of the transmitted radar beam. Thus, if a source of clutter is not moving ($V_s=0$) and the Doppler frequency, $f_D$, equals=0, that is, the Doppler frequency is in the "near zero velocity band" of the radar's reflected signal.

However, equipment instabilities, such as phase noise, often place a limit on the degree of attenuation available from Doppler processing. As a result, any "clutter leakage" in target range-velocity-angle resolution cells may be high enough to degrade the probability of detection of a target.

Inadequate Doppler filtering or cancellation is most likely to occur at low elevation angles where the transmit beam and receive beam are directed or steered close to the radar horizon. In these cases, the lower edges of the main transmit beam (or "lobe") may illuminate clutter scatters, for example, buildings and vegetation.

One potential solution to the attenuation of clutter in the reflected receive beam, for example clutter that exceeds the radar's Doppler cancellation limit, is to reduce the clutter level either at the input to or at the output of a Doppler processor of a radar system. This reduction of clutter can be accomplished by reducing the radar's transmit beam gain or receive antenna gain, or both, in the direction of the clutter scatters by modifying the shape of the beams. For example, existing beam shaping techniques include 1) element-space nulling and 2) beam-space nulling.

However, there are disadvantages of element-space nulling. Recognizing this, the present invention, which employs an improved beam-space nulling technique that overcomes the disadvantages of the prior art, was conceived and developed.

SUMMARY OF THE INVENTION

According to aspects of the present invention, an improved beam-space nulling technique, for example, a digital beam-space nulling technique, is provided that may employ two or more simultaneous receive beam channel outputs. These channel or receiver outputs are weighted and summed to form the equivalent of a shaped beam that has better, for example, reduced, clutter characteristics than any one of the original received beams. In the case of a radar array, aspects of the invention may be used with at least two beamformers. In the case of a radar reflector, aspects of the invention may be used with at least two antenna feeds.

Aspects of the present invention employing beam-space nulling may be ideally suited for radar applications where there are two or more simultaneous receive beams, for example, simultaneous receive beams stacked in the vertical or elevation dimension. In one aspect of the invention, only one degree of freedom, that is, one beam channel serving as an "auxiliary" channel may be used to cancel or suppress clutter in another channel, for example, the "main" channel. In aspects of the invention where only one degree of freedom is provided, the invention may be easily adapted to the environment and not be limited by antenna or receiver equipment errors. Furthermore, in one aspect, because aspects of the invention can be implemented by digital signal processing rather than analog signal processing, aspects of the invention can provide an adaptive weight that can be computed relatively quickly, and the unique adaptive weight can be applied by range-angle resolution cell, for example, to every range-angle resolution cell that requires spatial nulling.

In addition, according to aspects of the invention, spatial clutter mitigation via beam shaping may impose a potential cost since any shaping of a beam's main lobe, even if only regions well below the −3 dB gain locus, may sufficiently distort the main lobe such that the gain in potential target direction may be reduced. Accordingly, aspects of the invention may address this potential cost by balancing the gain loss on a target with a resulting reduction in clutter, so that, for example, the net signal-to-interference ratio (SINR) with interference defined as clutter plus noise may be improved relative to the quiescent or unmodified beam.

In one aspect of the invention, the simultaneous beam channel acting as the auxiliary beam may be steered to around zero degrees (0) elevation. The auxiliary beam channel signal may be multiplied by an adaptive weight, for example, a complex adaptive weight, and the product of the multiplication subtracted from the signal from the main beam channel to reduce main beam gain on the clutter, for example, at near zero degrees elevation. In one aspect, because the processing is linear, the application of the adaptive weight and subsequent subtraction can be applied to the data streams of the two beams, for example, I/Q (in-phase and quadrature-phase) data streams of the two beams, either
   a) after pulse-compression and prior to ("Pre-") the Doppler filter banks (DFBs) computed from the data streams, or
   b) after pulse-compression and after ("Post") DFBs outputs computed from the data streams.

In one aspect, Doppler-domain clutter nulling (that is, "Doppler nulling") may be a radar system's primary defense against clutter, for example, against terrain surface clutter, while adaptive spatial nulling according to aspects of the invention may serve only as a supplemental and/or additional mitigation of clutter. For example, aspects of the invention may supplement Doppler nulling of clutter for range-azimuth resolution cells (for example, range-azimuth bins or simply "range bins") having a relatively high "clutter-to-noise ratio" (CNR) which may not be sufficiently reduced by Doppler processing alone. Accordingly, in some aspects of the invention, it is neither expected nor required that spatial nulling produce the high clutter cancellation or suppression required of Doppler processing.

Accordingly, one embodiment of the invention is a method for suppressing clutter when detecting targets of interest with a radar system comprising an antenna system and at least two receive beams, the method comprising or including: receiving I/Q data streams from each of the at least two receive beams, each of the I/Q data streams associated with range bins and including data representing clutter; Doppler filtering the I/Q data streams at each of the range bins and thereby generating for each of the I/Q data streams multiple Doppler-filtered I/Q data streams for each of the range bins; generating a weight from summations of the I/Q data streams for each of the range bins; applying the generated weight to at least one of the multiple Doppler-filtered I/Q data streams to provide at least one weighted I/Q data stream; combining the at least one weighted I/Q data stream with one of the other multiple Doppler-filtered I/Q data streams to thereby generate at least one weighted Doppler-filtered I/Q data stream representing spatial nulling of clutter for each of the range bins; and using the at least one weighted Doppler-filtered I/Q data stream representing spatial nulling of clutter for each of the range bins to detect targets. The at least two receive beams may typically be simultaneous received beams stacked in the vertical or elevation dimension, as known in the art.

In one aspect, the process of generating the weight may be practiced by computing the weight based on a summation of the I/Q data streams across pulses for each of the I/Q data streams.

In one aspect of the invention, the method may further comprise or include comparing at least one of the summations of the I/Q data streams to a predetermined threshold. In addition, in one aspect, when the at least one of the summations exceeds the predetermined threshold, the method may further comprise equating the weight to zero.

In another aspect of the invention, the method may further comprise or include comparing an absolute value, that is, a magnitude, of the weight to a predetermined threshold. In addition, in one aspect, generating the weight from the summations of the I/Q data streams may comprise generating the weight from a quotient including the summations of the I/Q data streams, and wherein, when the absolute value of the quotient exceeds the predetermined threshold weight, decreasing the quotient. The quotient may be decreased by increasing the denominator of the quotient In another aspect, generating the weight from the summations of the I/Q data streams may comprise or include equating the weight to a quotient of one of the summations of the I/Q data streams divided by a sum of another of the summations of the I/Q data streams and a predetermined constant, for example, a constant $\delta$. Also, the practice of comparing the absolute value to the predetermined threshold may comprise comparing the absolute value of the weight to the absolute value of the quotient to the predetermined threshold. In one aspect of the invention, when the absolute value of the quotient is greater than the predetermined threshold, the method may include decreasing the quotient, for example, by increasing the predetermined constant, $\delta$.

Another embodiment of the invention is a method for suppressing clutter when detecting targets of interest in a radar system comprising an antenna system and at least two receive beams, the method comprising or including: receiving I/Q data streams from each of the at least two receive beams, each of the I/Q data streams associated with range bins and including data representing clutter; generating a weight from summations of the I/Q data streams for each of the range bins; applying the generated weight to at least one of the I/Q data streams to provide at least one weighted I/Q data stream; combining the at least one weighted I/Q data stream with one of the other multiple Doppler-filtered I/Q data streams to thereby generate at least one weighted I/Q data stream representing spatial nulling of clutter for each of the range bins; Doppler filtering the at least one weighted I/Q data stream for each of the range bins to generate at least one Doppler-filtered, spatially-nulled data stream having suppressed clutter for the range bins; and using the at least one Doppler-filtered, spatially-nulled data stream having suppressed clutter for the range bins to detect targets. The at least two receive beams may typically be simultaneous received beams stacked in the vertical or elevation dimension, as known in the art.

A further embodiment of the invention is system for suppressing clutter when detecting targets of interest with a radar system comprising an antenna system and at least two receive beams, the system comprising or including: a receiver configured to receive data streams representative of each of the at least two receive beams, and generate at least two I/Q data streams associated with range bins and including data representing clutter; one or more Doppler filters configured to Doppler filter the at least two I/Q data streams at each of the range bins and thereby generate at least two Doppler-filtered I/Q data streams for each of the range bins; one or more processors configured to generate a weight from summations of the Doppler-filtered I/Q data streams for each of the range bins, to apply the generated complex weight to at least one of the at least two Doppler-filtered I/Q data streams to provide at least one weighted I/Q data stream; to combine the at least one weighted I/Q data stream with one of the other at least two Doppler-filtered I/Q data streams to thereby generate a spatially-nulled, Doppler-filtered I/Q data stream representing spatial nulling of clutter for each of the range bins; and a detection processor adapted to use the a spatially-nulled, Doppler-filtered I/Q data stream for each of the range bins to detect targets. The at least two receive beams may typically be simultaneous received beams stacked in the vertical or elevation dimension, as known in the art.

In one aspect, configured to generate the weight from summations of the I/Q data streams comprises configured to compute the weight based on the summations of the I/Q data streams across pulses for each of the I/Q data streams.

In another aspect of the invention, the one or more processors may further be configured to compare at least one of the summations of the I/Q data streams to a predetermined threshold. In one aspect, when the at least one of the summations exceeds the predetermined threshold, the one or more processors are configured to equate the weight to zero.

In yet another aspect of the invention, the one or more processors are further configured to compare an absolute value of the weight to a predetermined threshold. For example, in one aspect, configured to generate a weight from summations of the I/Q data streams may comprise or include configured to generate the weight from a quotient including the summations of the I/Q data streams, and wherein, when the absolute value of the quotient exceeds the predetermined threshold, decreasing the quotient. For example, the quotient may be decreased by increasing the denominator of the quotient.

A still further embodiment of the invention is a system for suppressing clutter when detecting targets of interest with a radar system comprising an antenna system and at least two receive beams, the system comprising or including: a receiver configured to receive data streams representative of each of the at least two receive beams, and generate at least two I/Q data streams associated with range bins and including data representing clutter; one or more processors configured to generate a weight from summations of the I/Q data streams for each of the range bins, to apply the generated a weight from at least one of the at least two I/Q data streams, and to thereby generate a weighted I/Q data stream representing spatial nulling of clutter for each of the range bins; one or more Doppler filters configured to Doppler filter the at least two I/Q data streams at each of the range bins and thereby generate at least two weighted, Doppler-filtered I/Q data streams for each of the range bins; and a detection processor adapted to use the weighted, Doppler-filtered I/Q data streams for each of the range bins to detect targets. The at least two receive beams may typically be simultaneous received beams stacked in the vertical or elevation dimension, as known in the art.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of this specification. The foregoing and other aspects, features, and advantages of the invention will be readily understood from the following detailed description of aspects of the invention taken in conjunction with the accompanying drawings in which:

FIGS. 2, 3, and 4 are schematic diagrams illustrating the manipulation of the signals received by an antenna system according to aspects of the invention.

FIG. 7 is a duplication of FIG. 4, and shows a representative plot of the signals received corresponding to range bins, $N_R$, for pulses, $N_P$, shown in FIG. 3.

FIG. 8 is a representative plot of the sum of the signals received in each range bin for each pulse corresponding to range bins for pulse signals shown in FIG. 7.

DETAILED DESCRIPTION OF THE INVENTION

Figure 1:
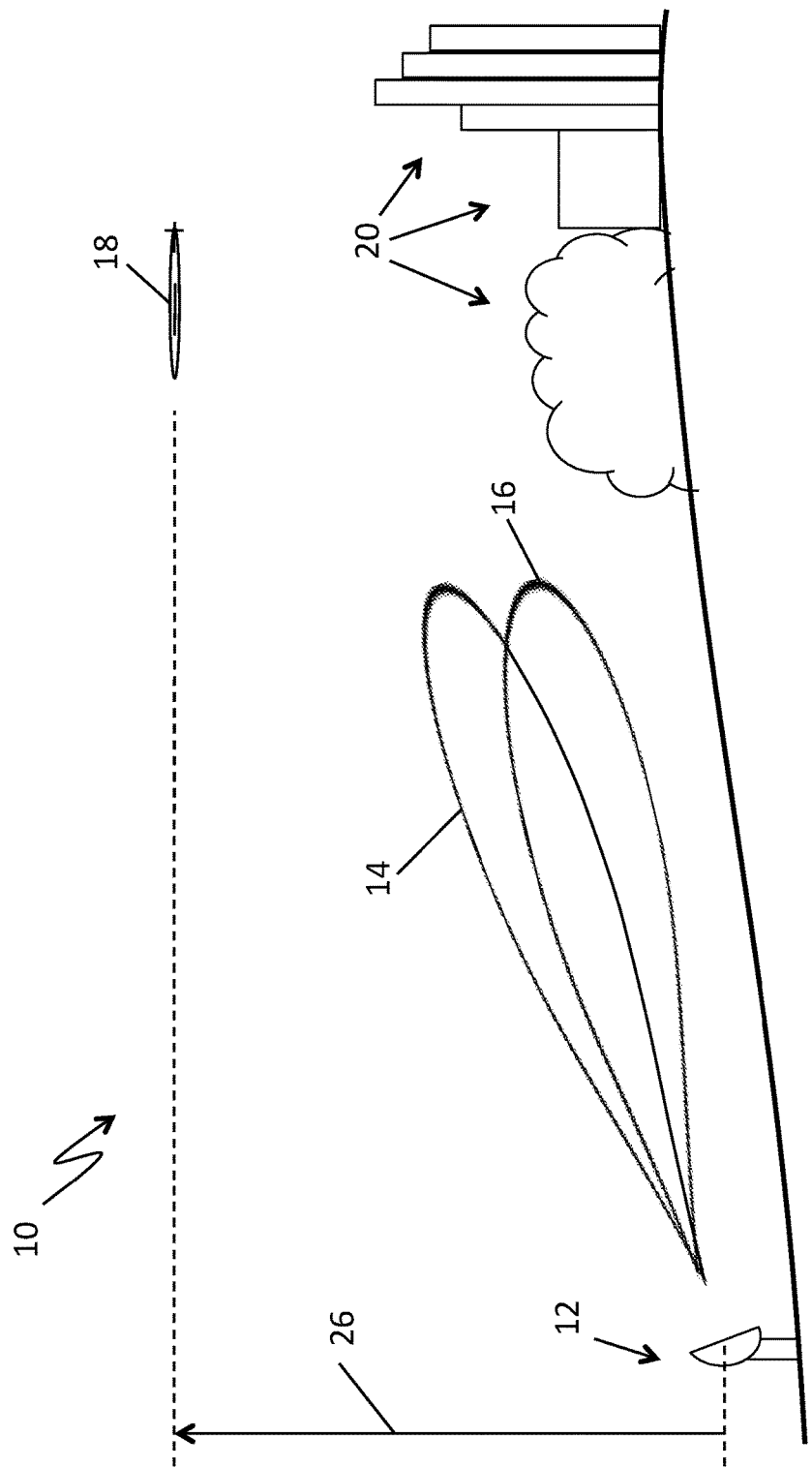
FIG. 1 is a schematic diagram of a radar antenna system that may be adapted to implement aspects of the present invention.

FIG. 1 is a schematic diagram of a radar antenna system 10, for example, a "pulse-Doppler" radar system, that may be adapted to implement aspects of the present invention. The structures shown in FIG. 1, and in the other figures herein, are not intended to be illustrated to scale, but are dimensioned as shown to facilitate illustration, description, and operation of aspects of the invention. It is to be understood that like reference numbers in all figures provided herein refer to similar, if not identical, structures, for example, to identical structures to those structures shown in FIG. 1.

As shown in FIG. 1, in one aspect, system 10 includes one or more transmitting and receiving antenna systems 12 adapted to transmit one or more radar beams (not shown) to detect one or more targets 18, for example, an airplane. Radar system 10 may comprise, for example, a commercial air traffic control system or a military target detection system, among other radar applications. As known in the art, the transmitted radar beam reflects from targets 18 and other structures to yield two or more reflected beams 14 and 16, which are received by antenna system 12. The at least two receive beams may typically be simultaneous receive beams stacked in the vertical or elevation dimension, as known in the art. In one aspect, when the cluster of simultaneous beams is electronically steered, the received beams may be stacked vertically in "sine-space." As known in the art, sine-space and elevation are similar when the cluster of beams is steered near broadside, but may differ significantly when the beam cluster of simultaneous beams is electronically steered away from broadside. The received beams 14 and 16 may typically be oriented at different directions or elevations, that is, received beams 14 and 16 may be "off-set" or "squinted" as known in the art, that is, oriented at different elevation angles with respect to antenna system 12.

FIG. 1 also illustrates representative sources of "clutter" or "ground clutter" 20, that is, buildings, structures, terrain, trees, mountains, and/or bodies of water, and the like, that may interfere with the detection of targets 18. According to aspects of the invention, the influences of the presence of such sources of clutter on the desired detection of targets 18 can be suppressed, minimized, and/or eliminated, and thus enhance the accuracy and/or efficiency of the detection of targets 18.

As shown in FIG. 1, off-set received beams 14 and 16 received by antenna system 12 of system 10 may be directed at different elevations: beam 14 may be oriented at a higher elevation and be less exposed to the influence of clutter 20, and beam 16 may be oriented at a lower elevation and be more exposed to the influence of clutter 20. In one aspect, the higher elevation received beam 14 may be referred to as "the main beam" and the lower elevation received beam 16 may be referred to as "the auxiliary beam" or "the aux beam."

As known in the art, although beams 14 and 16 are represented in FIG. 1 as single "lobes" to facilitate illustration, beams 14 and 16 typically comprise a series of "pulses"

of electromagnetic (EM) radiation or energy, for example, radio waves at a given frequency. For example, beams 14 and 16 may comprise a plurality of pulses of EM radiation defined by a "pulse repetition frequency" (PRF), that is, a rate at which pulses are transmitted from antenna system 12. The plurality of pulses emitted by antenna system 12 may be referred to as a "burst" of pulses, where a burst may comprise a plurality of EM pulses. Correspondingly, the EM of reflected received beams 14 and 16 from target 18 and clutter 20 received by antenna system 12 are also received in the form of pulses and the received pulses associated with bursts. As is known in the art, the power of EM beam received by antenna system 12 is expressed in the form decibels [dB]. According to aspects of the present invention, the pulses of beams 14 and 16 are received by antenna system 12 and are processed to minimize the effect of clutter 20 on the detection of targets 18.

As known in the art, the beams 14 and 16 from one or more targets 18 and clutter 20 are received by antenna system 12, and the received beams 14 and 16 are processed, for example, modulated, amplified, down-converted, and/or passed through detector circuitry to estimate the location and/or speed of targets 18.

FIGS. 2, 3, and 4 are schematic diagrams illustrating some of the processing and/or manipulation of the signals received by antenna system 12 according to aspects of the invention. Antenna system 12 and target 18 shown in FIG. 1 also appear in FIG. 2.

As known in the art, antenna system 12 identifies the location of the coordinates of target 18 by "range" (that is, the distance from antenna 12) as indicated by arrow 22 in FIG. 2; "azimuth" (that is, left to right location relative to a datum, for example, the orientation of antennas 12) as indicated by arrow 24 in FIG. 2; and "elevation" (that is, height above a datum, for example, the elevation above antenna system 12) as indicated by arrow 26 in FIG. 1.

FIG. 2 is a plan view of the relative location of antenna system 12 and target 18 for an azimuth 24 that characterizes antenna system 12, for example, 1 to 2 degrees, and the range (distance) associated with antenna system 12. As shown in FIG. 2, in this aspect, range 22 is subdivided into range intervals or spaces 28.

FIG. 3 is a representative plot of signal power or signal "strength" 30, for example, in dB, of the EM signal received by antenna system 12 in FIG. 2 over range 22. For the sake of ease of illustration, FIG. 3 illustrates only one signal or "trace" 32 for a single pulse for what typically comprises a plurality of traces of reflected pulses 34 received by antenna system 12 for the plurality of pulses, or burst, transmitted by antenna system 12. As shown in FIG. 3, the power 30 of trace 32 increases as indicated at for example, at a range corresponding to the target 18.

FIG. 4 is representative plot of the signals corresponding to "range bins" 40, for example, in dB, of the EM signal trace 32 shown in FIG. 3 over range 22. As known in the art, the use of "range bins" 40 is a procedure by which radar signals are electronically isolated into range intervals 28 (FIG. 1) and into which the respective received signal 32 can be summed over the range of pulses 34 received (as discussed below with respect to FIG. 8). The sums accumulated in the range bins 40 may be analyzed, for example, compared to a given value (such as, the average noise value) and the presence of a target 18 determined. For example, if the power of the received signal increases over successive pulses 34, the use of range bins can assist in differentiating targets from "noise." In addition, when antenna system 12 identifies received signals in adjacent range bins 40, it is more likely that a target 18 is present at the range of the range bins. In aspects of the present invention, the summation of data in the range bins 40 shown in FIG. 4 are used to calculate weighting factors used in minimizing clutter.

Figure 5:
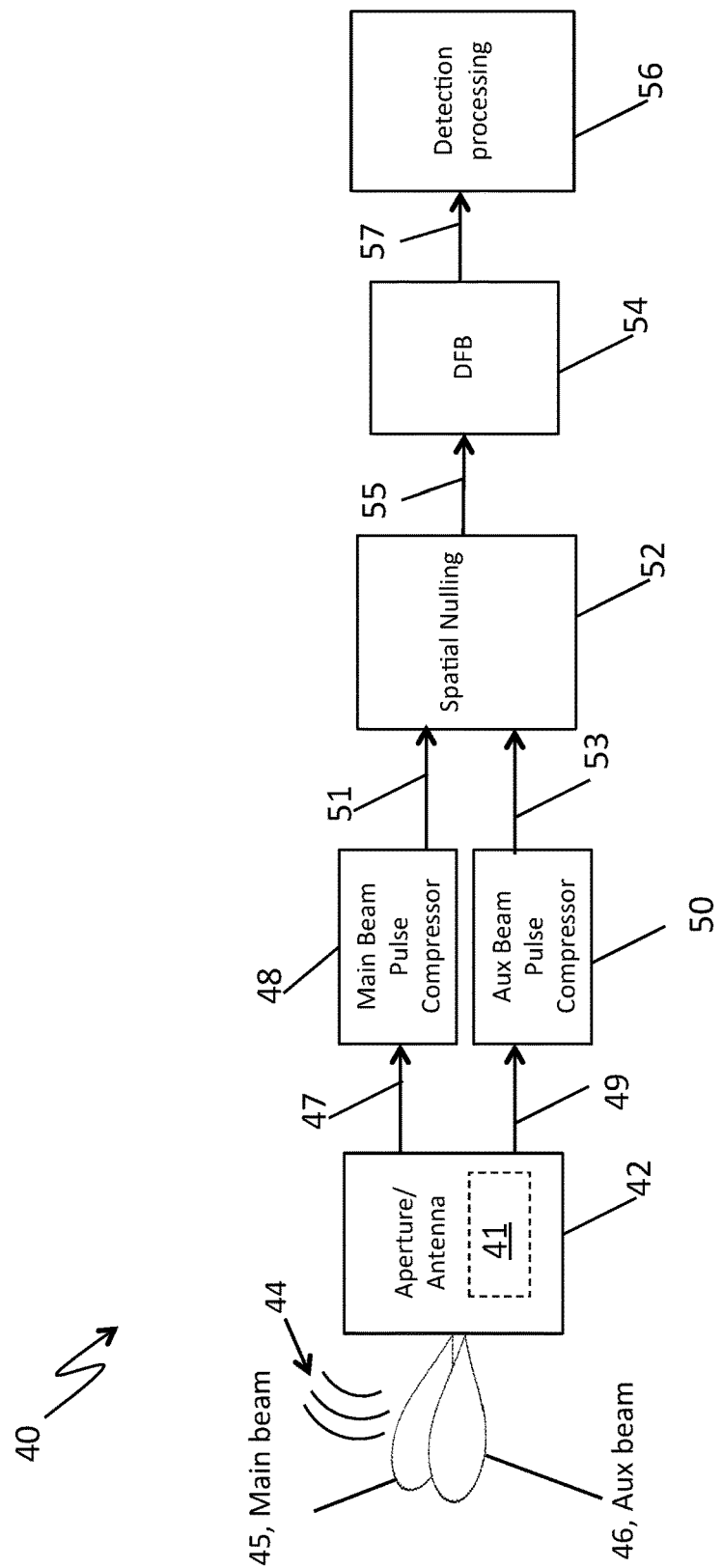
FIG. 5 is a schematic block diagram of a signal processing antenna system that may be used for the antenna system shown in FIG. 1 according to aspects of the present invention.

FIG. 5 is a schematic block diagram of a signal processing antenna system 40 that may be used for antenna system 12 shown in FIGS. 1 and 2 according to aspects of the present invention. As shown in FIG. 5, antenna system 40 may include an antenna/aperture 42 adapted to transmit one or more signals 44 and a receiver 41 adapted to receive reflected signals 45 (for example, a "main" or "upper" beam) and 46 (for example, an "aux" or "lower" beam) from one or more targets and/or clutter, for example, one or more targets 18 shown in FIG. 2, as described herein. Antenna/aperture 42 typically also includes a beamformer, as known in the art.

As known in the art, receiver 41 of antenna/aperture 42 may be adapted to receive reflected beams 45 and 46 and through, for example, comparison of the two received beams 45 and 46 with the transmitted beam 44 generate output data streams 47 and 49 corresponding to the received beams 45 and 46, respectively. As is typical in the art, receiver 41 may typically include at least one analog-to-digital (A/D) converter for converting received analog return signals 45 and 46 to digital form. Accordingly, output data streams 47 and 49 may typically comprise digital signals containing an amplitude and a phase associated with received beams 45 and 46, as expressed by "in-phase" (I) and "quadrature-phase" (Q) signals, commonly referred to as "I/Q data" streams. Since the I/Q data streams 47 and 49 may be expressed as complex numbers, data streams 47 and 49 may typically be referred to as "complex data" streams 47 and 49.

As is typical in the art, antenna system 40 may include two or more pulse compressor modules 48 and 50 (for example, a "main beam pulse compressor" module and an "aux beam pulse compressor" module) associated with the two or more received reflected signals 45 and 46; one or more spatial nulling modules 52 according to aspects of the present invention; one or more Doppler nulling modules (or "Doppler Filter Banks" (DFB)) 54; and one or more detection processing modules 56. According to this aspect of the invention, the nulling of spatial nulling module 52 is practiced before the nulling of Doppler nulling module 54, therefore, in one aspect, the antenna system 40 shown in FIG. 5 comprises a "Pre-Doppler spatial nulling" system.

Pulse compression modules 48 and 50 receive data streams 47 and 49, from antenna/aperture 42 and output modulated upper and lower data streams 51 and 53, respectively. Again, according to aspects of the invention, data streams 51 and 53 may be complex, I/Q data streams. In addition, data streams 51 and 53 may be "correlated" with respect to range bin n, for example, where the data associated with a range bin n for data stream 51 (for example, the main data stream) is related to the data associated with the same range bin n for data stream 53 (for example, the aux data stream). Data streams 51 and 53 are then processed by spatial nulling module 52, according to aspects of the invention—the details of the spatial nulling module 52 are disclosed and illustrated with respect to FIG. 6 below.

After spatial nulling 52 the spatially-nulled data stream 55 may then be forwarded to Doppler filter module 54 where spatially-nulled data stream 55 may be Doppler-nulled to produce spatially-nulled, Doppler-nulled data stream 57. As shown in FIG. 5, spatially-nulled, Doppler-nulled data stream 57 may then be forwarded to detection processing 56 to, for example, be used to more accurately locate targets detected by antenna system 40.

Figure 6:
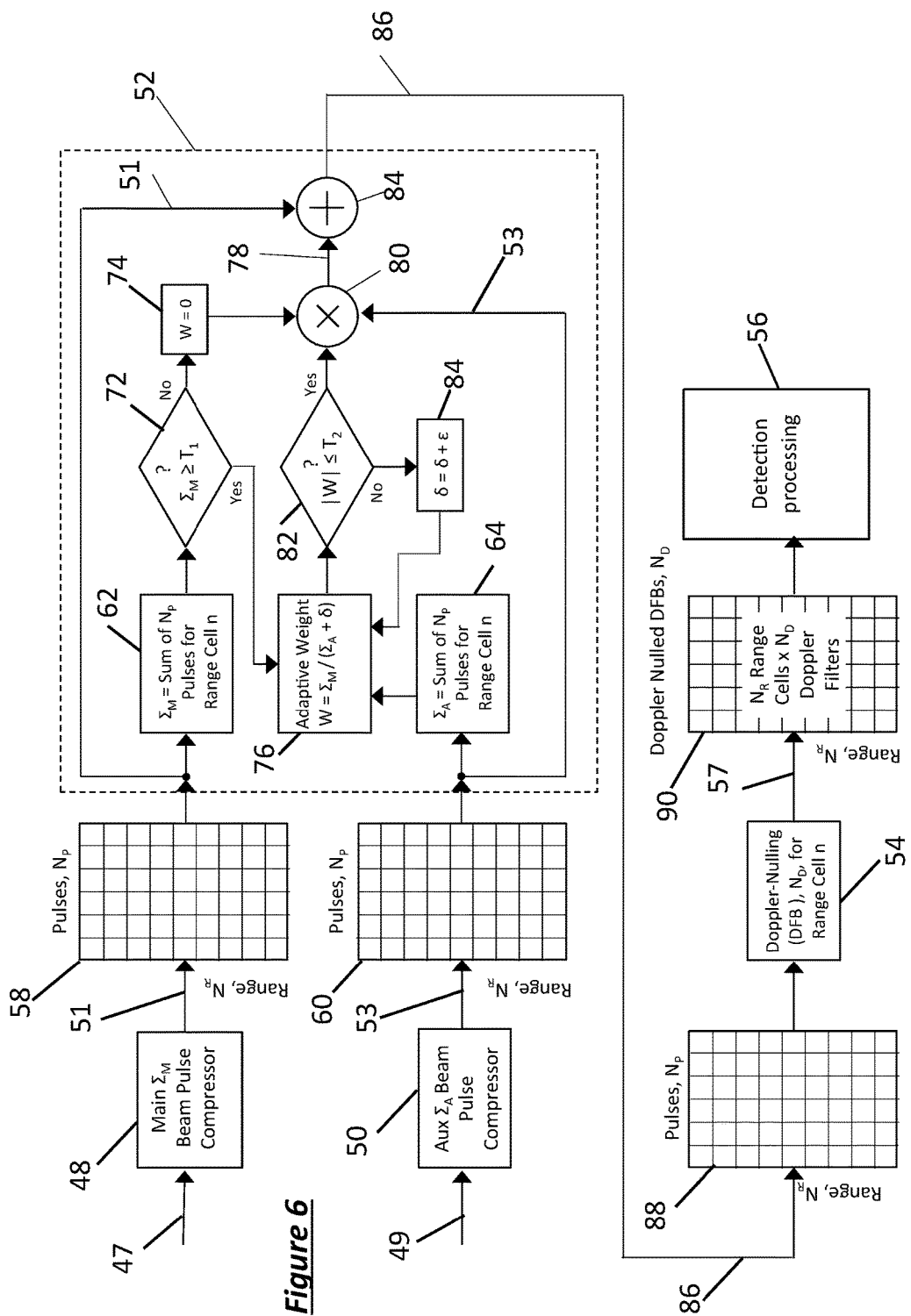
FIG. 6 is a detailed flow diagram with annotation for the spatial nulling practiced in the spatial nulling module shown in FIG. 5 according to an aspect of the present invention.

FIG. 6 is a detailed flow diagram with annotation for the spatial nulling practiced in spatial nulling module 52 shown in FIG. 5 according to an aspect of the present invention. As shown in FIG. 6, the spatial nulling module 52 (represented by the components outlined by a dash line in FIG. 6) receives data stream 51 from compressor module 48 and data stream 53 from compressor module 50. As noted above, data streams 51 and 53 may comprise complex I/Q data streams.

According to aspects of the invention, in addition to other processes, pulse compressor modules 48 and 50 may also sum or add the received pulse samples by range bin, for example, in each range bin for each received beam. In one aspect, these summations may comprise "tapered summations," where a taper is an amplitude profile multiplicatively imposed onto the data. In one aspect, the summation of pulses samples per range bin may typically yield two or more coherent, complex (that is, I/Q) data streams. In one aspect, the complex data streams may comprise complex high "clutter-to-noise-ratio" (CNR) data streams that are representative of the net clutter signals in the received signals (or signal channels).

The sum of the "main" data stream data may be represented by "$\Sigma_M$"; the sum of the "aux" data stream data may be represented by "$\Sigma_A$." This summing is represented schematically in FIGS. 7 and 8. In one aspect of the invention, the sum of the "main" data stream data represented by, $\Sigma_M$, contains the same data or information as the zero frequency Doppler bin (also know as, the "zero Doppler bin").

FIG. 7 is a duplication of FIG. 4, and shows a representative plot of the signals (in dB) received corresponding to range bins, $N_R$, 40 for pulses, $N_P$, 34 in a burst shown in FIG. 3. FIG. 8 shows a representative plot of the sum 66 ($\Sigma_M$ or $\Sigma_A$) (in dB) of the signals received in each range bin 40, for each pulse, $N_P$, in the burst corresponding to range bins, $N_R$, 40 for pulses, $N_P$, 34 shown in FIG. 7. As shown in FIG. 8, in this example plot, which is presented for illustration only and does not limit the scope of the present invention, the sum ($\Sigma_M$ or $\Sigma_A$) of the data streams 51 or 53 per pulse result in a "peak" 68 corresponding to the location of target 18 shown in FIG. 2. As also illustrated in FIG. 8, the sums of the data outside peak 62 may be substantially low, as illustrated by peak 70 in FIG. 8, or non-existent, according to aspects of the invention, and thus may not appear in FIG. 8. In other aspects of the invention, other peaks (such as, peaks similar to peak 66 or 70) may also appear in a plot similar to the plot shown in FIG. 8, which may correspond to targets, clutter, or noise in data streams 51 and 53.

In one aspect, each summation ($\Sigma_M$ or $\Sigma_A$) may represent the output of a Doppler filter centered on a specific frequency, for example, a presumed center of the clutter's power spectral density spectrum, such as, at 0 Hz. In one aspect, the taper used in the summation, for example, Blackman weights, may be selected to produce a filter response that has low side lobes at non-desired Doppler frequencies. Consequently, in one aspect, the summations, for example, as shown in FIG. 8, may have negligible contamination from undesired sources.

In the aspect of the invention shown in FIG. 6, data stream 51 and 53 are also represented by representative matrices or grids or "data cubes" 58 and 60 to facilitate disclosure of aspects of the invention. Matrices 58 and 60 represent the 2-dimensional nature of data streams 51 and 53. For example, matrices 58 and 60 may comprise summations ($\Sigma_M$ or $\Sigma_A$) of the pulse data for the number of pulses emitted and received, $N_P$, by receiver 41 (see FIG. 5) for each range bin n for the number of range bins, $N_B$, generated by receiver 41.

In other words, according to one aspect of the invention, data streams 51 and 53 in FIG. 6 may comprise two-dimensional matrices representing the summations ($\Sigma_M$ or $\Sigma_A$) of the amplitudes and phase of the received signals 43 and 45 for each pulse received for each range bin. According to aspects of the invention, at least some of the data streams 51 or 53 contain data related to clutter, as disclosed herein.

As shown in FIG. 6, according to aspects of the present invention, spatial nulling module 52 receives each of the data streams 51 and 53 for each of range bins $N_B$ for each of the pulses $N_P$ in modules 62 and 64, respectively. After receipt, modules 62 and 64 may sum the data streams 51 and 53 for each of range bins $N_B$ for each of the pulses $N_P$ to produce the respective summed data streams $\Sigma_M$ and/or $\Sigma_A$. As shown in FIG. 6, in one aspect of the invention, decision or comparison module 72 compares (for example, "gates") the sum of the data stream ($\Sigma_M$ or $\Sigma_A$) at each range bin n of one of the data streams, for example, the sum of the data stream for the main beam, $\Sigma_M$, to a predetermined threshold value, $T_1$, for the sum. In one aspect, the predetermined threshold value, $T_1$, may be derived from the number of pulses $N_P$ and an estimate of the radar system's phase-noise-induced and pulse-to-pulse jitter Doppler-domain clutter cancellation limit.

According to one aspect of the invention, should the sum of the data for the range bin n be less than (<) the threshold value $T_1$ (that is, not greater than or equal to $T_1$), thus indicating that no nulling of this range bin may be necessary, a weighting factor or an "adaptive weight," W, is set to zero, as indicated at 74 in FIG. 6. As will be disclosed further below, setting W to zero effectively eliminates the nulling of the data in range cell n, and, for example, no further processing of the nulling of the range cell need be practiced. An illustration of a representative threshold value $T_1$ with respect to the pulse sums $\Sigma_M$ or $\Sigma_A$ for each range bin is shown in FIG. 8.

According to another aspect of the invention, should the sum of the data ($\Sigma_M$) for the range bin n be greater than or equal to ($\geq$) the threshold value $T_1$, thus indicating that nulling of this range bin may be desired, for example, to reduce the single pulse clutter to noise-ratio (CNR), according to an aspect of the invention, an adaptive weighting factor, W, is computed. In one aspect, W may be computed as a function of the summations $\Sigma_M$ and $\Sigma_A$. Specifically, in one aspect, W may be computed as a quotient including the summations $\Sigma_M$ and $\Sigma_A$ for each range bin n. In one aspect, the weighting factor, W, is defined as the quotient that appears in Equation 1.

$$W = \Sigma_M / (\Sigma_A + \delta) \quad \text{Equation 1.}$$

In Equation 1, W is the adaptive weighting factor; $\Sigma_M$ is the sum of one stream of data, for example, the main data stream 51, for range bin n from module 62; $\Sigma_A$ is the sum of another stream of data, for example, the aux data stream 53, for range bin n from module 64; and δ is a predetermined constant selected based upon the parameters of the system 40 (see FIG. 5). In one aspect, δ may be referred to as the "null depth control constant."

In one aspect of the invention, the weighting factor W may be applied to one of the "aux pulse" data stream 53 to generate a spatially-nulled data stream 78 for each range bin n. In one aspect, applying weighting factor W to a data stream may comprise multiplying 80 the data stream, for example, data stream 53, by weighting factor W to yield a spatially-nulled data stream 78.

In another aspect, the weighting factor W may be compared to (for example, "gated") with a second threshold value $T_2$, as indicated at comparison module 82. In one aspect, the absolute value of weighting factor or the magnitude of W (|W|) may be compared with threshold value $T_2$. According to an aspect of the invention, the comparing of the magnitude of W to $T_2$ may be practiced to determine whether any unacceptable distortion of the 2-way beam has occurred. According to aspects of the invention, the threshold value $T_2$ may range from about 0.05 to about 3.0, but is typically in the range of about 0.2 to about 0.5 for example, on the order of about 0.3.

According to this aspect of the invention, should the absolute value of weighting factor W for the range bin n be less than or equal to (≤) the second threshold value $T_2$, thus indicating that weighting factor W is of sufficient magnitude to provide a valid spatial nulling, weighting factor W may be applied to one of data stream 51 or 53, but typically 53, to generate a spatially-nulled data stream 78 for each range bin n.

In another aspect, should the absolute value of weighting factor W be greater than second threshold value $T_2$, that is, not less than or equal to (≤) second threshold value $T_2$, an adjustment may be made to weighting factor W.

In one aspect, the weighting factor W may be reduced. In one aspect, the weighting factor may be reduced to limit both the magnitude of the adaptive weight W, and/or to reduce the resulting spatial cancellation ratio (CR) to no more than necessary to supplement Doppler nulling. In addition, in one aspect, limiting the weight magnitude (|W|) and the CR may minimize the distortion of the effective nulled beam pattern and, consequently, may minimize gain loss in potential target directions.

In one aspect, as indicated at module 84, weighting factor W may be reduced by, first, increasing the value of predetermined constant δ by a predetermined constant ε, as indicated by Equation 2.

$$\delta = \delta + \varepsilon \qquad \text{Equation 2.}$$

In one aspect, ε may be referred to as an "increment to δ." In another aspect, the magnitude of W may be limited by the value of δ. For example, the value of δ may affect the receive gain advantage of the auxiliary receive beam, for instance, the aux beam, in the direction of potential surface clutter and be more compliant.

As shown in FIG. 6, with an increase in the value of δ computed by Equation 2, Equation 1 might be re-evaluated, as indicated in module 76, for a new value of weighting factor W. In one aspect, this new weighting factor W may again be compared to second threshold value $T_2$, as indicated at 82, and, if less than or equal to $T_2$, applied to one of the data streams. In one aspect, when the new value of W is not less than or equal to $T_2$, the value of W may be further decreased, for example, by increasing δ in module 84, and re-evaluating W in module 76 and, again, comparing W in module 82. This process may continue until weighting factor W complies with the gating of module 82.

However, according to some aspects of the invention, for example, in some "outlier" cases, a particular clutter distribution may result in a weight magnitude (|W|) on the order of one or greater, for instance, despite the limiting effects of the value of δ. For example, it is envisioned that 1) a single dominant clutter source at an elevation angle that produces a larger response in the main beam than in the auxiliary beam may increase the weight magnitude (|W|) desired, or 2) multiple clutter sources that may coherently sum to a larger response in the main beam than in the auxiliary beam may increase the weight magnitude (|W|) desired. In these and other cases, δ may be increased to bring the weight magnitude down below the threshold $T_2$ and processing may proceed with some cancellation of clutter sacrificed to control distortion of the nulled beam shape.

As noted above, should the value of $\Sigma_M$ not be greater than or equal to threshold value T1, the weighting factor for range bin n may be equated to zero (W=0) and applied to one of the data streams 51 or 53, typically, aux data stream 53. As indicated in FIG. 6 applying W=0 to data stream 53 may comprise multiplying data stream 53 by zero to generate nulled data stream 78 with a value of zero, and thus eliminating at least some spatial nulling of the data stream for the specific range bin n under consideration.

According to aspects of the invention, regardless of the weighting factor W, weighting factor W may be applied to, for example, multiplied into, one of the data streams 51 or 53, for example, to aux data stream 53, to provide a weighted data stream 78. As shown in FIG. 6, in one aspect, weighted data stream 78 may then be applied to one of the data streams 51 or 53, for example, main data stream 51, to produce a spatially nulled data stream 86. In one aspect, "applied to" may comprise adding weighted data stream 78 to one of the data streams 51 or 53, for example, data stream 51, as indicated at addition module 84, to produce a spatially-nulled data stream 86.

In one aspect, spatially-nulled data stream 86 comprises a pulse-by-pulse, spatially-nulled data stream that is spatially nulled for some or a plurality of range bins, for example, each or all range bins $N_R$.

According to aspects of the invention, for the aspect shown in FIG. 6 or for any aspect disclosed herein, regardless of the value of weighting factor W, a single, unique weighting factor W may be provided per range bin. For example, in one aspect, a single, unique weighting factor W may be provided for each range bin requiring spatial nulling. In one aspect, a single, unique weighting factor W may be provided for all the Doppler bins at each range bin, $N_P$.

In the aspect of the invention shown in FIG. 6, spatially-nulled data stream 86 may be represented by a representative matrix or grid or data cube 88 to facilitate disclosure of aspects of the invention. Matrix 88 represents the 2-dimensional nature of data stream 86, for example, comprising pulse data for the number of pulses received, $N_P$, for each range bin n for the number of range bins, $N_B$, generated by spatial nulling module 52. In one aspect, matrix or data cube 88 represents the spatially nulled range-pulse data cube for each pulse burst having pulses $N_P$.

As shown in FIGS. 5 and 6, after the spatially-nulled data stream 86 is generated by spatial nulling module 52, the spatially-nulled data stream 86 may be Doppler-nulled in Doppler-nulling module 54 to generate a Doppler-nulled, spatially-nulled data stream 57 that may then be forwarded to detection processing module 56. Doppler nulling in Doppler-nulling module 54 may be practiced by any Doppler nulling procedure or algorithm to suppress the influence of, for example, any moving targets on the data stream and produce Doppler-nulled, spatially nulled data stream 57. For example, in one aspect, Doppler nulling in module 54 may comprise "zero-hertz" Doppler nulling or its equivalent.

In the aspect of the invention shown in FIG. 6, Doppler-filtered, spatially-nulled data stream 57 may be represented by a representative matrix or grid or data cube 90 to facilitate disclosure of aspects of the invention. Matrix 90 represents the 2-dimensional nature of data stream 57, for example, comprising Doppler-filtered, spatially-nulled pulse data for each range bin n for the number of range bins, $N_R$, generated by the number of Doppler filters, $N_D$, of Doppler nulling module 54. As known in the art, the Doppler Filter Bank (DFB) of Doppler filter module 54 may yield a matrix 90 of range bins, $N_R$, by Doppler filters, $N_D$.

According to aspects of the invention, detection processing in detection processing module 56 may comprise any detecting process or algorithm. In one aspect, detection processing may be practiced by conventional means, such as by thresh-holding via CFAR (Constant False Alarm Rate) processing, and like methods.

As illustrated in FIGS. 5 and 6, according to aspects of the invention, each range cell, that is, each range-azimuth cell may be independently nulled to supplement Doppler nulling, if needed.

As known in the art, since Doppler nulling and spatial nulling both comprise linear coherent processing, Doppler nulling and spatial nulling are commutative. That is, though the spatial nulling disclosed with respect to FIGS. 5 and 6 above followed the Doppler filtering, spatial nulling disclosed with respect to FIGS. 5 and 6 may commute with Doppler filtering and precede Doppler filtering. In one aspect, though spatial nulling may precede or follow Doppler filtering, pulse compression may be performed first. In some aspects, pulse compression must be performed prior to spatial nulling and/or Doppler filtering.

Figure 9:
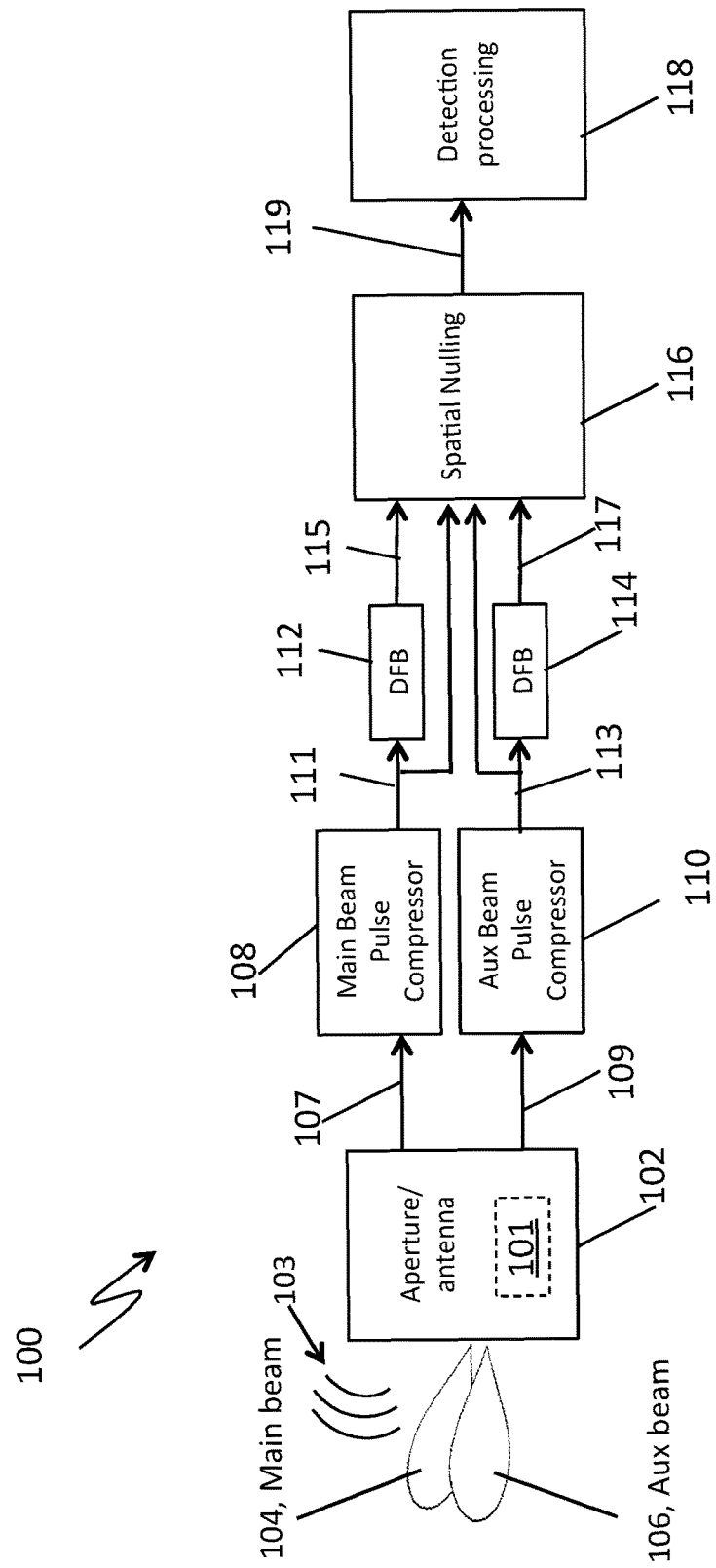
FIG. 9 is a schematic block diagram of another signal processing antenna system that may be used for the antenna system shown in FIG. 1 according to another aspect of the present invention.

FIG. 9 is a schematic block diagram of a signal processing antenna system 100 that may be used for antenna system 12 shown in FIGS. 1 and 2 according to another aspect of the present invention. As shown in FIG. 9, in a fashion similar to antenna system 40 shown in FIG. 5, antenna system 100 may include an antenna/aperture 102 adapted to transmit one or more signals 103 and a receiver 101 adapted to receive reflected signals 104 (for example, a "main" or "upper" beam) and 106 (for example, an "aux" or "lower" beam) from one or more targets and/or clutter, for example, one or more targets 18 shown in FIG. 1, as described herein.

As known in the art, receiver 101 of antenna/aperture 102 may be similar to and have the functionality of receiver 41 of antenna/aperture 42 shown in FIG. 5. Accordingly, receiver 101 may be adapted to receive reflected beams 104 and 106 from transmitted beam 103, respectively, and through comparison of the two received beams 103 104 and 106 with the transmitted beam 103 generate output data streams 107 and 109 corresponding to the received beams 104 and 106, respectively. As is typical in the art, output data streams 107 and 109 may comprise digital I/Q data streams or complex data streams.

As is typical in the art, antenna system 100 may include two or more pulse compressor modules 108 and 110 (for example, a "main beam pulse compressor" module and an "aux beam pulse compressor" module) associated with the two or more received reflected signals 104 and 106; one or more Doppler nulling modules (or "Doppler Filter Banks" (DFB)) 112, 114; one or more spatial nulling modules 116 according to aspects of the present invention; and one or more detection processing modules 118.

According to this aspect, pulse compression modules 108 and 110 may be similar in functionality to pulse compressors 48 and 50 shown in FIG. 5. Accordingly, pulse compression modules 108 and 110 may receive data streams 107 and 109, from antenna/aperture 102 and output modulated upper and lower data streams 111 and 113. According to aspects of the invention data streams 111 and 113 may be I/Q data streams. Data streams 111 and 113 are then processed by Doppler filter modules 112 and 114, respectively, to produce Doppler-nulled data stream 115 and 117.

Doppler nulling in Doppler-nulling modules 112 and 114 may be practiced by any Doppler nulling process or algorithm to suppress the influence of, for example, any moving targets in the data stream, and produce Doppler-nulled data streams 115 and 117, respectfully. For example, in one aspect, Doppler nulling in modules 112 and 114 may comprise "zero-hertz" Doppler nulling or its equivalent.

As shown in FIG. 9, data streams 111 and 113 and Doppler-nulled data streams 115 and 117 may then be forwarded to spatial nulling module 116, according to aspects of the invention to yield a Doppler-nulled and spatially-nulled data stream 119. The details of the spatial nulling module 116 are illustrated and described with respect to FIG. 10 below. The Doppler-nulled and spatially-nulled data stream 119 from spatial nulling module 116 may then be forwarded to detection processing 118 to, for example, be used to more accurately locate targets detected by antenna system 100.

According to this aspect of the invention, the nulling of spatial nulling module 116 may be practiced after the nulling of Doppler nulling modules 112 and 114. Therefore, in one aspect, the antenna system 100 shown in FIG. 9 comprises a "Post-Doppler spatial nulling" system.

Figure 10:
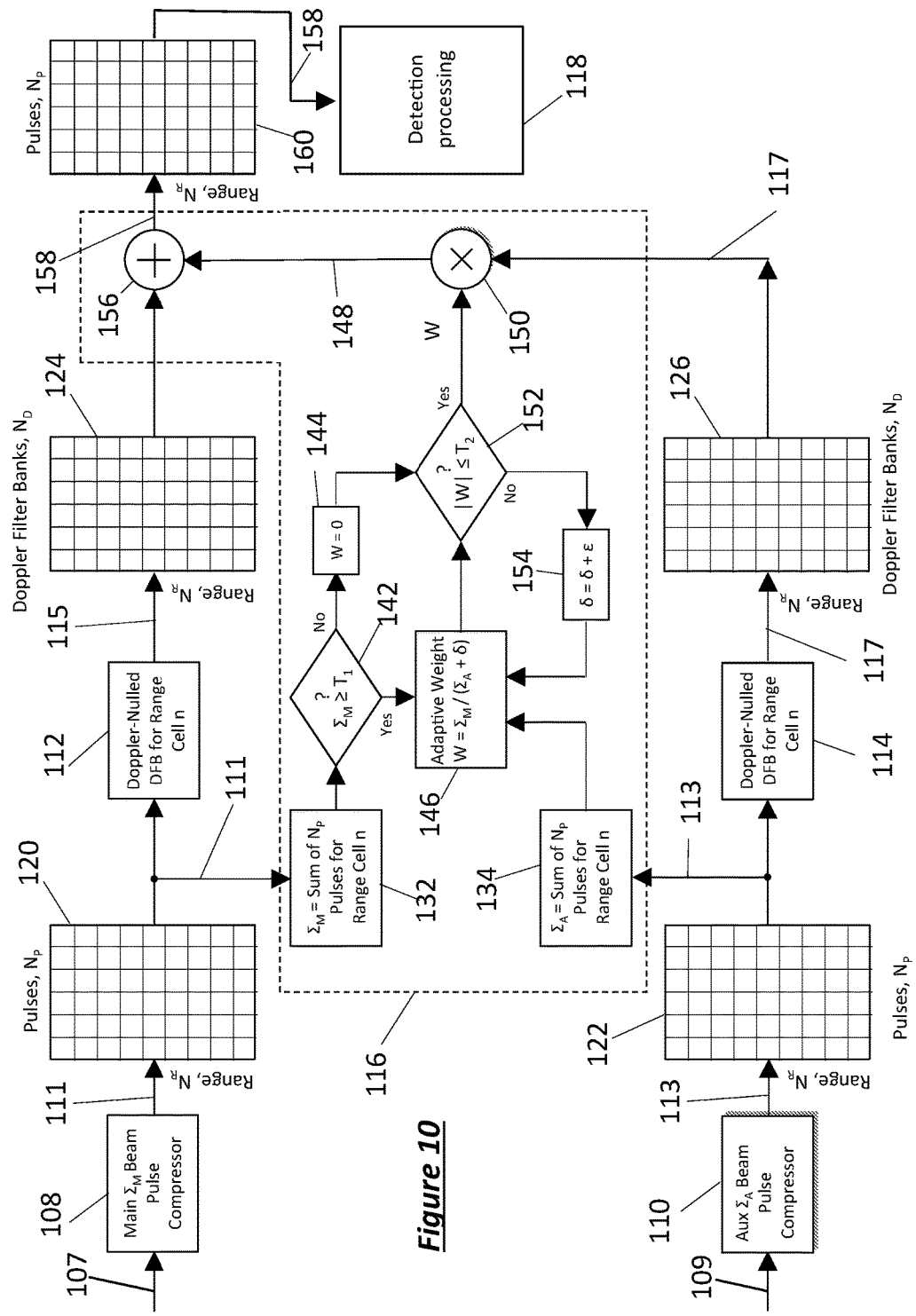
FIG. 10 is a detailed flow diagram with annotation for the spatial nulling practiced in spatial nulling module shown in FIG. 9 according to an aspect of the present invention.

FIG. 10 is a detailed flow diagram with annotation for the spatial nulling practiced in spatial nulling module 116 shown in FIG. 9 according to an aspect of the present invention. In order to facilitate disclosure of aspects of the invention, compressors 108 and 110, DFBs 112 and 114, and detection processing module 118 shown in FIG. 9 also appear in FIG. 10.

As shown in FIG. 10, the spatial nulling module 116 (represented by the components outlined by a dash line in FIG. 10) receives data stream 111 from compressor module 108, data stream 113 from compressor module 110, Doppler-nulled data stream 115 from Doppler nulling module 112, and Doppler-nulled data stream 117 from Doppler nulling module 114. As noted above, data streams 111, 113, 115, and 117 may comprise complex I/Q data streams.

According to aspects of the invention, in addition to other processes, pulse compressor modules 108 and 110 may also sum or add the received pulse samples by range cell, for example, in each range cell for each received beam. In one aspect, these summations may comprise "tapered summations." In one aspect, the summation of pulses samples per range cell may typically yield two or more complex (that is, I/Q) data streams. In one aspect, the complex data streams may comprise complex high "clutter-to-noise-ratio" (CNR) data streams that are representative of the net clutter signals in the received signals (or signal channels).

In a manner similar to the process disclosed in FIG. 6, the sum of the "main" data stream data may be represented by $\Sigma_M$ in FIG. 10, and the sum of the "aux" data stream data may be represented by $\Sigma_A$. This summing is represented schematically in FIGS. 7 and 8, as discussed above.

In the aspect of the invention shown in FIG. 10, as in other aspects disclosed herein, data stream 111, 113, 1115, and 117 are also represented by representative matrices or grids or data cubes 120, 122, 124, and 126, respectively, to facilitate disclosure of aspects of the invention. Matrices 120, 122, 124, and 126, represent the possible 2-dimensional nature of data streams 111, 113, 115, and 117. For example, data streams 111 and 113 may comprise pulse data for the number of pulses emitted and received, $N_P$, by receiver 101 (see FIG. 9) for each range bin for the number of range bins, $N_B$, generated by receiver 101. In other words, according to one aspect of the invention, data streams 111 and 113 in FIG. 10 may comprise two-dimensional matrices representing the summations ($\Sigma_M$ or $\Sigma_A$) of the amplitudes or power of the received signals 104 and 106 for each pulse received for each range bin. Matrices 124 and 126 represent the 2-dimensional nature of data stream 115 and 117, for example, comprising Doppler-filtered pulse data for each range bin n for the number of range bins, $N_R$, generated by the number of Doppler filters, $N_D$, of Doppler nulling modules 112 and 114. As known in the art, the Doppler Filter Banks (DFB) of Doppler filter modules 112 and 114 may yield matrices 124 and 126 of range bins, $N_R$, by Doppler filters, $N_D$. According to aspects of the invention, at least some of the data streams 111, 113, 115, and 117 contain data related to clutter, as disclosed herein.

In one aspect of the invention, the data processing practiced in spatial nulling module 116 may be similar, if not substantially identical, to the data processing described for nulling module 52 shown in and described with respect to FIG. 6. In one aspect, the distinction between the processing shown in and described with respect to FIG. 10 differs from that shown in and described with respect to FIG. 6 in the relative timing of the spatial nulling with respect to the Doppler nulling. For example, in FIG. 6, the spatial nulling is practiced before the Doppler nulling; in FIG. 10, the spatial nulling is practiced after the Doppler nulling.

As shown in FIG. 10, according to aspects of the present invention, spatial nulling module 116 receives each of the data streams 111 and 113 for each of range bins $N_B$ for each of the pulses $N_P$ for each of range bins $N_B$ in modules 132 and 134, respectively. After receipt, modules 132 and 134 may sum the data streams 111 and 113 for each of range bins $N_B$ for each of the pulses $N_P$ to produce the respective summed data streams $\Sigma_M$ and/or $\Sigma_A$. In one aspect of the invention, decision or comparison module 142 compares (for example, "gates") the sum of the data stream at each range bin n of one of the data streams, for example, the sum of the data stream for the main beam, $\Sigma_M$, to a predetermined threshold value, $T_1$, for the sum. According to this aspect of the invention, should the sum of the data for the range bin n be less than (<) the threshold value $T_1$, thus indicating that no nulling of this range bin is necessary, a weighting factor or an "adaptive weight," W, is set to zero, as indicated at 144, effectively eliminating the nulling of the data in range cell n under consideration. An illustration of threshold $T_1$ with respect to the pulse sums $\Sigma_M$ or $\Sigma_A$ for each range bin is shown in FIG. 8. The value of threshold $T_1$ may be substantially the same as the value of threshold value $T_1$ shown in and described with respect to FIG. 6.

As shown at 142 in FIG. 10, according to another aspect of the invention, should the sum of the data for the range bin n be greater than or equal to (≥) the threshold value $T_1$, thus indicating that nulling of this range bin is desired, a weighting factor, W, is computed as a function of the summations $\Sigma_M$ and $\Sigma_A$, for example, a function of a quotient having the sums $\Sigma_M$ and $\Sigma_A$ for each range bin n. In one aspect, the weighting factor, Equation 1 shown in and described with respect to FIG. 6, and repeated here defines W.

$$W=\Sigma_M/(\Sigma_A+\delta) \quad \text{Equation 1.}$$

The variables in Equation 1 and the range of values δ may be the same as those described with respect to FIG. 6.

As shown in FIG. 10, in one aspect of the invention, the weighting factor W may be applied to the "aux pulse" data stream 117 to generate a spatially-nulled data stream 148 for each range bin n. In one aspect, applying weighting factor W to a data stream may comprise multiplying 150 the data stream, for example, data stream 117 by weighting factor W to yield a spatially-nulled data stream 148.

In another aspect, the weighting factor W in FIG. 10 may be compared to (for example, "gated") with a second threshold value $T_2$, as indicated at comparison module 152. In one aspect, the absolute value weighting factor W (|W|) may be compared with threshold value $T_2$. According to this aspect of the invention, should the absolute value of weighting factor W for the range bin n be less than or equal to (≤) the second threshold value $T_2$, thus indicating that weighting factor W is of sufficient magnitude to provide a valid spatial nulling, weighting factor W may be applied to one of the Doppler-nulled data stream 115 or 117 to generate a spatially-nulled data stream 148 for each range bin n. The value of threshold $T_2$ may be substantially the same as the value of threshold value $T_2$ shown in and described with respect to FIG. 6.

In another aspect, should the absolute value of weightings factor W be greater than second threshold value $T_2$, that is, not less than or equal second threshold value $T_2$, an adjustment may be made to weighting factor W. In one aspect, the weighting factor W is reduced. For example, in one aspect, as indicated at module 154, weighting factor W is reduced by, first, increasing the value of predetermined constant δ by a predetermined constant ε, for example, in a fashion substantially identical to that illustrated in FIG. 6, for example, by Equation 2, which is reproduced here.

$$\delta=\delta+\varepsilon \quad \text{Equation 2.}$$

In one aspect, value of ε may be substantially identical to the values of ε disclosed with respect to FIG. 6.

As shown in FIG. 10, with the increase in the value of δ computed by Equation 2, Equation 1 is re-evaluated, as indicated in module 146, for a new value of weighting factor W. In one aspect, this new weighting factor W may again be compared with second threshold value $T_2$, and, if less than or equal to $T_2$, applied to one of the data streams. In one aspect, when the new value of W is not less than or equal to $T_2$, the value of W may be decreased, for example, by again increasing δ in module 154, and re-evaluating W in module 146 and comparing W in module 152. This process may continue until weighting factor W complies with the gating of module 152.

As noted above, should the value of $\Sigma_M$ not be greater than or equal to threshold value T1, the weighting factor for range bin n is equated to zero (W=0) as shown at 144 and applied to one of the Doppler-nulled data streams 115 or 117, typically, aux data stream 117. As indicated in FIG. 10, applying W=0 to data stream 117 may comprise multiplying data stream 117 by zero, thus eliminating any spatial nulling of the data for the specific range bin n under consideration.

According to aspects of the invention, regardless of the weighting factor W, weighting factor W is then applied to, for example, multiplied into as indicated at 150, one of the Doppler-nulled data streams 115 or 117, for example, to aux data stream 117, to provide a weighted data stream 148. As shown in FIG. 10, in one aspect, weighted data stream 148 may then be applied to one of the Doppler-nulled data streams 115 or 117, for example, data stream 115, to produce a Doppler-nulled and spatially-nulled data stream 158. In one aspect, "applied to" may comprise adding weighted data stream 148 to one of the Doppler-nulled data streams 115 or 117, for example, data stream 115, as indicated at addition module 156, to produce a Doppler-nulled and spatially-nulled data stream 158.

In one aspect, Doppler-nulled and spatially-nulled data stream 158 may comprise a pulse-by-pulse, Doppler-nulled, spatially-nulled data stream that is Doppler-nulled and spatially-nulled for some or a plurality of range bins, for example, for each or all range bins $N_R$.

In the aspect of the invention shown in FIG. 10, Doppler-nulled and spatially-nulled data stream 158 may be represented by a representative matrix or grid or data cube 160 to facilitate disclosure of aspects of the invention. Matrix 160 represents the possible 2-dimensional nature of Doppler-nulled and spatially-nulled data stream 158, for example, comprising pulse data for the number of pulses received, $N_P$, for each range bin n for the number of range bins, $N_B$, generated by spatial nulling module 116. In one aspect, matrix or data cube 160 represents the spatially nulled range-pulse data cube for each pulse burst having pulses $N_P$.

As shown in FIGS. 9 and 10, after Doppler-nulled and spatially-nulled data stream 158 is generated by spatial nulling module 116, the Doppler-nulled and spatially-nulled data stream 158 may be forwarded to detection processing module 118. According to aspects of the invention, detection processing in detection processing module 118 may comprise any detecting process or algorithm. In one aspect, detection processing may comprise any one of the detection processes disclosed above with respect to detection processing module 56 in FIG. 6.

As illustrated in FIGS. 9 and 10, according to aspects of the invention, each range bin, that is, each range-azimuth bin may be independently nulled to supplement Doppler nulling, if needed.

Figure 11:
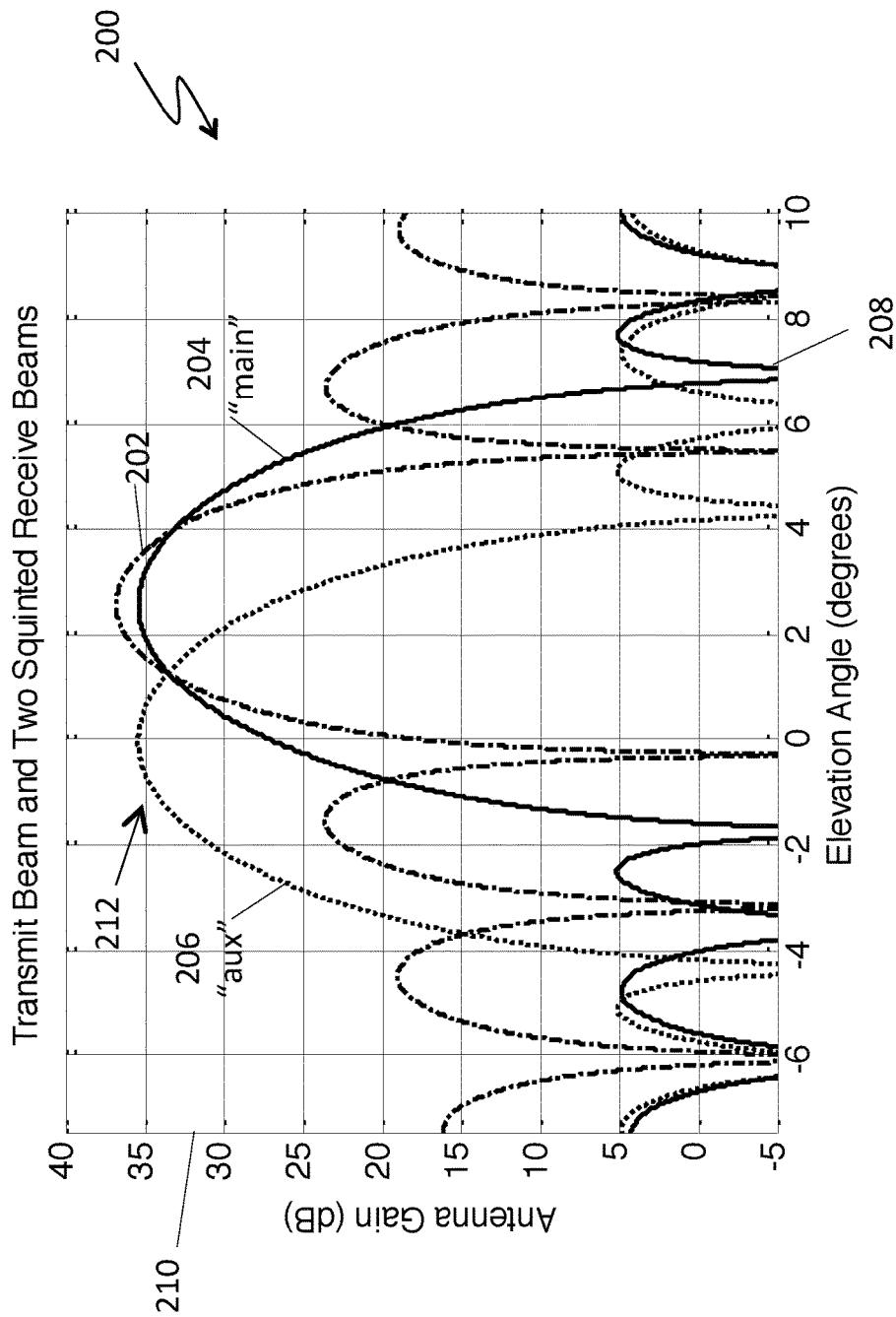
FIG. 11 is a representative plot of a typical transmitted radar beam and two receive beams according to one aspect of the invention.

FIG. 11 is a representative plot 200 of a typical "unweighted" transmitted radar beam represented by curve 202 and two weighted receive beams 204 and 206, according to one aspect of the invention. The two weighted receive beams 204 and 206 may be a first receive beam represented by curve 204 corresponding to a "main" beam, and a second received beam represented by curve 206, corresponding to an "aux" beam, according to aspects of the invention. The second received beam or aux beam 206 is a 30-dB-weighted receive beam suitable for use as the "auxiliary" beam, according to aspects of the invention.

The abscissa 208 of plot 200 represents the elevation angle of the beams (in degrees) and the ordinate 210 represents the antenna gain (in decibels (dB)). As indicated in FIG. 11, the elevation angles of the transmitted "main" beam 202 and of first received "main" beam 204 are in the range of about 2-3 degrees, and the elevation of second received "aux" beam 206 is about 0 degrees. Accordingly, in this example, the transmitted "main" beam 202 and the first received "main" beam 204 at about the same elevation form a "two-way pair" of transmitted and received beams for target detection. In this example, the transmitting/receiving antenna comprises an array-type antenna having 32 rows of antenna elements and 32 elements per row.

In the representative example shown in FIG. 11, the ground clutter is assumed to be located at about 0 degrees elevation. Since the two-way pair of beams 202 and 204 are elevated from the assumed location of ground clutter, the first receive beam 204 has reduced gain on the ground clutter at 0 degrees—that is, since there was little or no reflectance from the clutter. In contrast, the second receive beam 206 directed at about 0 degrees exhibits a relatively high gain, that is, indicating relatively high reflectance from ground clutter as indicated at 212, for example, a maximum gain (36 dB).

Figure 12:
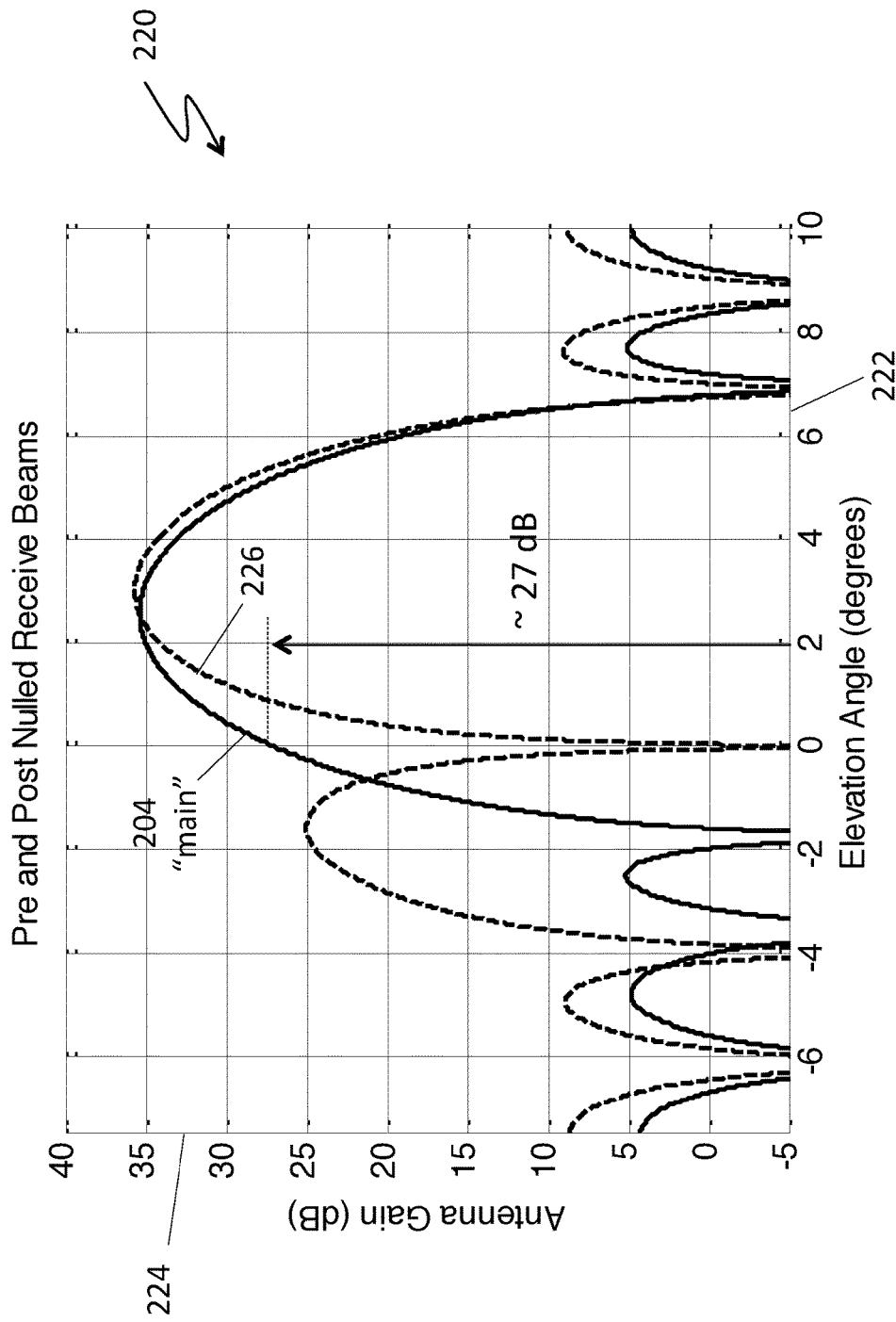
FIG. 12 is a representative plot that illustrates the spatial nulling of a received beam shown in FIG. 11 before and after spatial nulling according to aspects of the invention.

FIG. 12 is a representative plot 220 that illustrates the spatial nulling of first received signal 204 (shown in FIG. 11), for example, the "main channel," before and after spatial nulling according to aspects of the invention. Again, the abscissa 222 of plot 220 represents the elevation angle of the beams (in degrees) and the ordinate 224 represents the antenna gain (in decibels (dB)).

As shown in FIG. 12, the first received signal represented by curve 204 (also shown in FIG. 11) comprises a weighted (for example, 30 dB Taylor weighted) main channel receive beam before spatial nulling. Curve 226 represents the weighted (for example, 30 dB Taylor weighted) receive beam after spatial nulling on clutter (at 0 degrees elevation), according to aspects of the invention.

As shown in FIG. 12, in this example, where the initial "quiescent" received beam 204 indicates an antenna gain of about 27 dB at 0 degrees elevation (that is, an indication of the clutter located at 0 degrees elevation), the spatially-nulled beam 226 indicates an antenna gain of about 0 dB at 0 degrees elevation. That is, according to aspects of the present invention, the clutter located about 0 degrees elevation (as detected, for example, by the gain associated with first or "main" receive beam 204 (see FIG. 11) has been suppressed in second received or "aux" beam 206 (see FIGS. 11 and 12) to yield a clutter-suppressed signal 226.

According to aspects of the invention, the clutter-suppressed signal 226 (along with other similar clutter suppressed signals) can be used to more accurately detect targets 18, for example, with target detection processing module 118 shown in FIG. 10. Moreover, according aspects of the invention, this clutter suppression can be practiced by range bin, for example, at each range bin under consideration by the system or method.

As also indicated in FIG. 12, the perturbation to the pattern is also apparent, where a perturbation is a deviation from its unadapted gain pattern. That is, in one aspect, the amount of the clutter reduction or suppression can be controllable as previously described. Reducing the spatial nulling reduces the pattern perturbation and helps to restore loss of target gain.

According to aspects of the invention disclosed herein, a single, unique weight W may be provided and applied to data streams based upon range bin, that is, based upon individual range bins. It is also envisioned that adaptive weight W may also be computed based upon more than one range bin, for example, two or more range bins. In a further refinement, it envisioned that an adaptive weight W may also be computed from a range of range bins (for example, a contiguous block of range bins) or two or more ranges of range bins (for example, two or more split "windows" or non-contiguous ranges of range bins). The one or more adaptive weights W computed from two or more range bins may then be applied (for example, multiplied) to one or more range bins, for example, to one or more range bins associated with or not associated with the range bins from which the one or more weights W are computed.

It is believed that providing one or more adaptive weights W based upon one or more range bins, as disclosed herein, may provide advantages over the use of weights based upon single range bins. The potential advantages include: 1) fewer weights W need be computed because the resulting average weights can be applied to multiple range cells; and 2) signals received from targets may inherently be excluded from the weight computations when the weights are based upon one set of range cells and applied to another. However, it is also recognized that there may be disadvantages to providing one or more adaptive weights based upon one or more range bins. These disadvantages may include 1) more computations per weight W; and 2) reduced spatial cancellation performance because the clutter signal can fluctuate by tens of dB from cell to cell while the weight is tuned to an average. However, it is believed that these perceived disadvantages may be overcome by the actual advantages of aspects of the invention.

As described herein, it is envisioned that the spatial nulling according to aspects of the invention, as indicated by FIGS. 11 and 12, may augment or be added to the Doppler-based reduction or suppression of clutter and provide improvements over the existing art. For example, aspects of the invention are believed to provide unique advantages over the prior art. Some of these advantages include:

1) simplicity, because each weight, W, may be simply the function of the ratio of two complex numbers;
2) superior spatial cancellation performance, because each weight may be substantially tuned to the particular clutter scatterer distribution and signal it is intended to suppress;
3) target signals may be inherently excluded from the weight computations due to Doppler offsets combined with heavy Doppler weighting; and
4) any target signals at very low Doppler frequency may generally be much lower than the terrain clutter.

As disclosed herein, aspects of the invention may be uniquely adapted for use in radar systems, for example, in pulse-Doppler radar systems. However, it is envisioned that the systems and methods of the present invention may also be used to minimize or eliminate clutter in any form of remote sensing system, including, but not limited to, sonar systems, navigation systems, and guidance systems.

The embodiments disclosed herein are described by way of example only, and other embodiments for implementing the methods and systems described herein may be contemplated by one of skill in the pertinent art without departing from the intended scope of this disclosure.

In additions, the methods and the systems described herein may include conventional data processing, storage, and user interfaces. For example, the method and systems disclosed herein may include memory devices containing data, which may include instructions, the instructions when executed by a processor or multiple processors, cause the steps of the methods for performing the signal processing and weight generation as set forth herein. Software may be embodied in a non-transitory machine-readable medium upon which software instructions may be stored, the stored instructions when executed by a processor may cause the processor to perform the steps of the methods described herein. Any suitable machine-readable storage medium may be used, including, but not limited to, magnetic or optical disks, for example, CD-ROM, DVD-ROM, floppy disks, and the like. Other storage media also fall within the intended scope of this disclosure, for example, dynamic random access memory (DRAM), random access memory (RAM), read-only memory (ROM), or flash memory may also be used.

While various embodiments have been described above, it should be understood that these embodiments and their many aspects have been presented by way of example, and not limitation. It will be apparent to persons skilled in the relevant art that various changes in form and detail can be made therein without departing from the spirit and scope of the invention. Moreover, it is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The detailed description presented herein, therefore, is not to be taken in a limiting sense, and the scope of the present invention is defined only by the appended claims, appropriately interpreted, along with the full range of equivalents to which the claims are entitled.

Although the term "at least one" may often be used in the specification, claims and drawings, the terms "a", "an", "the", "said", etc. also signify "at least one" or "the at least one" in the specification, claims and drawings.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

The invention claimed is:

1. A method for suppressing clutter when detecting targets of interest with a radar system comprising an antenna system and at least two receive beams, the method comprising:
receiving I/Q data streams from each of the at least two receive beams, each of the I/Q data streams associated with range bins and including data representing clutter;
Doppler filtering the I/Q data streams at each of the range bins and thereby generating for each of the I/Q data streams multiple Doppler-filtered I/Q data streams for each of the range bins;
generating a weight from summations of the I/Q data streams for each of the range bins;
applying the generated weight to at least one of the multiple Doppler-filtered I/Q data streams to provide at least one weighted I/Q data stream;
combining the at least one weighted I/Q data stream with one of the other multiple Doppler-filtered I/Q data streams to thereby generate at least one weighted Doppler-filtered I/Q data stream representing spatial nulling of clutter for each of the range bins; and
using the at least one weighted Doppler-filtered I/Q data stream representing spatial nulling of clutter for each of the range bins to detect targets.

2. The method as recited in claim 1, wherein generating the weight comprises computing the weight based on a summation of the I/Q data streams across pulses for each of the I/Q data streams.

3. The method as recited in claim 1, wherein the at least two receive beams comprise at least a main beam and an auxiliary beam.

4. The method as recited in claim 1, wherein the method further comprises comparing at least one of the summations of the I/Q data streams to a predetermined threshold.

5. The method as recited in claim 4, wherein, when the at least one of the summations exceeds the predetermined threshold, equating the weight to zero.

6. The method as recited in claim 1, wherein the method further comprises comparing an absolute value of the weight to a predetermined threshold.

7. The method as recited in claim 6, wherein generating the weight from the summations of the I/Q data streams comprises generating the weight from a quotient including the summations of the I/Q data streams, and wherein, when the absolute value of the quotient exceeds the predetermined threshold weight, decreasing the quotient.

8. The method as recited in claim 6, wherein generating the weight from the summations of the I/Q data streams comprises equating the weight to a quotient of one of the summations of the I/Q data streams divided by a sum of another of the summations of the I/Q data streams and a predetermined constant, and wherein comparing the absolute value of the weight to the predetermined threshold comprises comparing the absolute value of the quotient to the predetermined threshold.

9. The method as recited in claim 8, wherein, when the absolute value of the quotient is greater than the predetermined threshold, decreasing the quotient.

10. The method as recited in claim 1, wherein generating the weight from the summations of the I/Q data streams comprises generating the weight, W, from the quotient including the summations of the I/Q data streams, $\Sigma_M$ and $\Sigma_A$, by the equation:

$$W=\Sigma_M/(\Sigma_A+\delta);$$

wherein $\delta$ comprises a predetermined constant.

11. A method for suppressing clutter when detecting targets of interest in a radar system comprising an antenna system and at least two receive beams, the method comprising:
 receiving I/Q data streams from each of the at least two receive beams, each of the I/Q data streams associated with range bins and including data representing clutter;
 generating a weight from summations of the I/Q data streams for each of the range bins;
 applying the generated weight to at least one of the I/Q data streams to provide at least one weighted I/Q data stream;
 combining the at least one weighted I/Q data stream with one of the other I/Q data streams to thereby generate at least one weighted I/Q data stream representing spatial nulling of clutter for each of the range bins;
 Doppler filtering the at least one weighted I/Q data stream for each of the range bins to generate at least one Doppler-filtered, spatially-nulled data stream having suppressed clutter for the range bins; and
 using the at least one Doppler-filtered, spatially-nulled data stream having suppressed clutter for the range bins to detect targets.

12. The method as recited in claim 11, wherein generating the weight comprises computing the weight based on a summation of the I/Q data streams across pulses for each of the I/Q data streams.

13. The method as recited in claim 11, wherein the at least two receive beams comprise at least a main beam and an auxiliary beam.

14. The method as recited in claim 11, wherein the method further comprises comparing at least one of the summations of the I/Q data streams to a predetermined threshold.

15. The method as recited in claim 14, wherein, when the at least one of the summations exceeds the predetermined threshold, equating the weight to zero.

16. The method as recited in claim 11, wherein the method further comprises comparing an absolute value of the weight to a predetermined threshold.

17. The method as recited in claim 16, wherein generating the weight from the summations of the I/Q data streams comprises generating the weight from a quotient including the summations of the I/Q data streams, and wherein, when the absolute value of the quotient exceeds the predetermined threshold weight, decreasing the quotient.

18. The method as recited in claim 16, wherein generating the weight from the summations of the I/Q data streams comprises equating the weight to a quotient of one of the summations of the I/Q data streams divided by a sum of another of the summations of the I/Q data streams and a predetermined constant, and wherein comparing the absolute value of the weight to the predetermined threshold comprises comparing the absolute value of the quotient to the predetermined threshold.

19. The method as recited in claim 18, wherein, when the absolute value of the quotient is greater than the predetermined threshold, decreasing the quotient.

20. The method as recited in claim 11, wherein generating the weight from the summations of the I/Q data streams comprises generating the weight, W, from the quotient including the summations of the I/Q data streams, $\Sigma_M$ and $\Sigma_A$, by the equation:

$$W=\Sigma_M/(\Sigma_A+\delta);$$

wherein $\delta$ comprises a predetermined constant.

* * * * *